(12) United States Patent
Bells et al.

(10) Patent No.: US 9,099,081 B2
(45) Date of Patent: *Aug. 4, 2015

(54) FACILITATING TEXT-TO-SPEECH CONVERSION OF A DOMAIN NAME OR A NETWORK ADDRESS CONTAINING A DOMAIN NAME

(71) Applicant: BLACKBERRY LIMITED, Waterloo (CA)

(72) Inventors: Matthew Bells, Kanata (CA); Jennifer Elizabeth Lhotak, Waterloo (CA); Michael Angelo Nanni, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/179,684

(22) Filed: Feb. 13, 2014

(65) Prior Publication Data

US 2014/0163993 A1    Jun. 12, 2014

Related U.S. Application Data

(63) Continuation of application No. 13/455,303, filed on Apr. 25, 2012, now Pat. No. 8,688,455, which is a continuation of application No. 12/171,550, filed on Jul. 11, 2008, now Pat. No. 8,185,396.

(51) Int. Cl.
*G10L 13/08* (2013.01)
*G10L 13/027* (2013.01)

(52) U.S. Cl.
CPC .............. *G10L 13/027* (2013.01); *G10L 13/08* (2013.01)

(58) Field of Classification Search
USPC .............. 704/1–10, 251, 255, 257, 231, 244, 704/250, 270, 260, 258; 709/245
See application file for complete search history.

(56) References Cited

U.S. PATENT DOCUMENTS

| 7,136,932 | B1 * | 11/2006 | Schneider ..................... 709/245 |
| 7,428,491 | B2 * | 9/2008 | Wang et al. .................... 704/244 |
| 2007/0043562 | A1 * | 2/2007 | Holsinger et al. ............ 704/231 |

OTHER PUBLICATIONS

Bells, Matthew, et al., U.S. Appl. No. 12/171,550, filed Jul. 11, 2008 entitled Facilitating Text-To-Speech Conversion of a Domain Name or a Network Address Containing a Domain Name.
Bells, Matthew, et al., U.S. Appl. No. 13/455,303, filed Apr. 25, 2012 entitled Facilitating Text-To-Speech Conversion of a Domain Name or a Network Address Containing a Domain Name.

* cited by examiner

*Primary Examiner* — Huyen Vo
(74) *Attorney, Agent, or Firm* — Perry + Currier Inc.

(57) ABSTRACT

To facilitate text-to-speech conversion of a username, a first or last name of a user associated with the username may be retrieved, and a pronunciation of the username may be determined based at least in part on whether the name forms at least part of the username. To facilitate text-to-speech conversion of a domain name having a top level domain and at least one other level domain, a pronunciation for the top level domain may be determined based at least in part upon whether the top level domain is one of a predetermined set of top level domains. Each other level domain may be searched for one or more recognized words therewithin, and a pronunciation of the other level domain may be determined based at least in part on an outcome of the search. The username and domain name may form part of a network address such as an email address, URL or URI.

20 Claims, 6 Drawing Sheets

| Network Address | Pronunciation | IPA | Comments |
| --- | --- | --- | --- |
| olinorth@conspiracy.mil | "oli north at conspiracy dot mil" | / alɪː ncɹθ ɛt kənˈspɪrəsi dɒt mɪl / | • Name of associated user found to be "Oliver North"<br>• "oli" determined to have high likelihood of pronounceability as it is found to be a prefix of first namd "Oliver" |
| liz@buckingham.uk | "liz at buckingham dot you kay" | / lɪz ɛt bʌkɪŋəm dɒt yu keɪ / | • Name of associated user found to be "Elizabeth Smith"<br>• "Liz" determined to be a diminutive form of "Elizabeth" |
| fng@cinema.co.hk | "ef eng at cinema dot see oh dot aytch kay" | / ɛf ŋ ɛt ˈsɪnəmə dɒt si oʊ dɒt eɪtʃ keɪ / | • Name of associated user found to be "Fawn Ng"<br>• Note that IPA representation of last name "Ng" may differ from typical American-English speaker pronunciation. |

FIG. 5

| Network Address | Pronunciation | IPA | Comments |
| --- | --- | --- | --- |
| baron@business.co.uk | "baron at business dot see oh dot you kay" | / ˈbærən ɛt ˈbɪznɪs dɒt yu keɪ / | "baron", "business" are recognized words |
| mayor@waterloo.on.ca | "mayor at waterloo dot oh en dot see ay" | / ˈmeɪər ɛt ˈwɒtərˌlu dɒt oʊ en dɒt si eɪ / | "mayor", "waterloo" are recognized words |

FIG. 6

FACILITATING TEXT-TO-SPEECH CONVERSION OF A DOMAIN NAME OR A NETWORK ADDRESS CONTAINING A DOMAIN NAME

CROSS-REFERENCE TO RELATED APPLICATION

This application is a continuation of U.S. application Ser. No. 13/455,303 filed Apr. 25, 2012, which is a continuation of U.S. application Ser. No. 12/171,550 filed Jul. 11, 2008, the contents of both of which are incorporated herein by reference.

FIELD OF TECHNOLOGY

The present disclosure pertains to text-to-speech (TTS) conversion, and more particularly to facilitating text-to-speech conversion of a network address or a portion thereof.

BACKGROUND

Conventional screen readers, i.e. software applications that attempt to interpret what is being displayed on a user interface screen and present the content in another form, which is usually speech, typically fare poorly when pronouncing network addresses such as electronic mail (email) addresses or Session Initiation Protocol (SIP) Uniform Resource Identifiers (URIs) (which have a format similar to that of email address, with a prepended "sip:"). For example, an email address of "sjones@work.us" may be pronounced "sss-jones at work dot us" rather than the more conventional human pronunciation "ess jones at work dot you ess". Alternatively, conventional screen readers may spell out the email address in full, i.e. speak each character individually (e.g. "ess jay oh en . . . "), which is tedious for the listener to listen to. For clarity, the foregoing quoted expressions represent pronunciations of the email addresses, as a typical speaker of the language might spell the pronunciations. These pronunciations could alternatively be represented by symbolic expressions in the International Phonetic Alphabet (IPA), which is a precise phonetic system using non-ASCII symbols to represent most (if not all) of the sounds that humans are capable of uttering.

A new approach for facilitating text-to-speech conversion of network addresses, or portions thereof, for use in screen readers or in other contexts would be desirable.

BRIEF DESCRIPTION OF DRAWINGS

In the figures which illustrate at least one exemplary embodiment:

FIGS. 5 and 6 illustrate exemplary pronunciations of exemplary network addresses.

DETAILED DESCRIPTION

Figure 1:
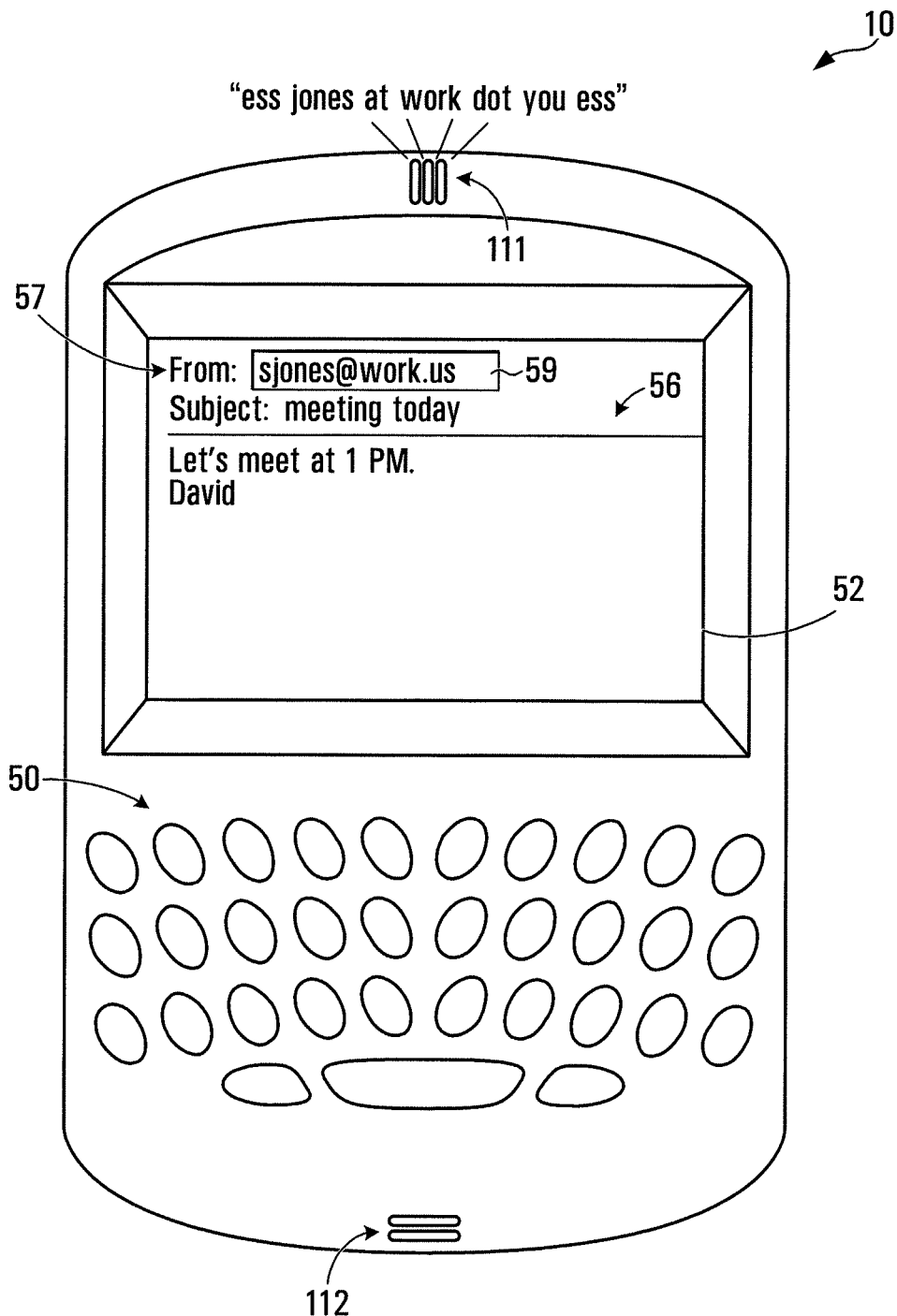
FIG. 1 illustrates an exemplary wireless communication device with a screen reader application capable of facilitating text-to-speech conversion of a network address or a portion thereof.

In one aspect of the below described embodiment, there is provided a method of facilitating text-to-speech conversion of a network address, comprising: if said network address comprises a username: retrieving a name of a user associated with said username, said name comprising one of a first name of said user and a last name of said user; and determining a pronunciation of said username based at least in part on whether said name forms at least part of said username; and if said network address comprises a domain name having a top level domain and at least one other level domain: determining a pronunciation of said top level domain based at least in part upon whether said top level domain is one of a predetermined set of top level domains; and for each of said at least one other level domain: searching for one or more recognized words within said other level domain; and further determining a pronunciation of said other level domain based at least in part on an outcome of said searching.

In another aspect of the below described embodiment, there is provided a method of facilitating text-to-speech conversion of a username, comprising: retrieving a name of a user associated with said username, said name comprising one of a first name of said user and a last name of said user; and determining a pronunciation of said username based at least in part on whether said name forms at least part of said username.

In another aspect of the below described embodiment, there is provided a method of facilitating text-to-speech conversion of a domain name having a top level domain and at least one other level domain, comprising: determining a pronunciation of said top level domain based at least in part upon whether said top level domain is one of a predetermined set of top level domains; and for each of said at least one other level domain: searching for one or more recognized words within said other level domain; and further determining a pronunciation of said other level domain based at least in part on an outcome of said searching.

In another aspect of the below described embodiment, there is provided a machine-readable medium storing instructions for facilitating text-to-speech conversion of a username that, when executed by a processor of a computing device, cause said computing device to: retrieve a name of a user associated with said username, said name comprising one of a first name of said user and a last name of said user; and determine a pronunciation of said username based at least in part on whether said name forms at least part of said username.

In another aspect of the below described embodiment, there is provided a machine-readable medium storing instructions for facilitating text-to-speech conversion of a domain name having a top level domain and at least one other level domain that, when executed by a processor of a computing device, cause said computing device to: determine a pronunciation for said top level domain based at least in part upon whether said top level domain is one of a predetermined set of top level domains; and for each of said at least one other level domain: search for one or more recognized words within said other level domain; and further determine a pronunciation of said other level domain based at least in part on an outcome of said search.

In another aspect of the below described embodiment, there is provided a computing device comprising: a processor; and memory interconnected with said processor storing instructions for facilitating text-to-speech conversion of a username that, when executed by said processor, cause said device to: retrieve a name of a user associated with said username, said name comprising one of a first name of said user and a last name of said user; and determine a pronunciation of said username based at least in part on whether said name forms at least part of said username.

In another aspect of the below described embodiment, there is provided a computing device comprising: a processor; and memory interconnected with said processor storing instructions for facilitating text-to-speech conversion of a domain name having a top level domain and at least one other level domain that, when executed by said processor, cause said device to: determine a pronunciation of said top level domain based at least in part upon whether said top level domain is one of a predetermined set of top level domains; and for each of said at least one other level domain: search for one or more recognized words within said other level domain; and further determine a pronunciation of said other level domain based at least in part on an outcome of said search.

Referring to FIG. 1, an exemplary hand-held wireless communication device 10 is illustrated. The illustrated device 10 is a two-way pager with RF voice and data communication capabilities, and has a keyboard 50, display 52, speaker 111 and microphone 112. The display 52, which may be liquid crystal display (LCD), displays a user interface (UI) screen 56. The UI screen 56 is generated by an email client application executing at device 10 which displays a received electronic mail (email) message. A "From:" field 57 of UI screen 56 indicates the email address 59 (a form of network address) of the sender of the message, which in this example is "sjones@work.us". The email address is highlighted in FIG. 1 simply to indicate that it is the network address whose pronunciation is being determined in the present example. It will be appreciated that this highlighting is only for facilitating reader comprehension of the present description, and is not required for the embodiment to function as described herein. Other conventional email message fields, such as a "Subject:" field and message body, are also illustrated in FIG. 1.

For illustration, it is assumed that a user of device 10, who may be visually impaired or who anticipates being distracted by other responsibilities that prevent the user from being easily able to read UI screens (e.g. driving a motor vehicle), wishes to have textual information within displayed UI screens converted to speech. Accordingly, the user has installed a screen reader application within the memory of device 10 for interpreting whatever UI screen is displayed within display 52 and presenting the content as speech over speaker 111. As will be described, the screen reader application employs an approach for converting email addresses to speech that results in a pronunciation which may be preferred by the user over pronunciations generated by conventional screen reader applications.

Figure 2:
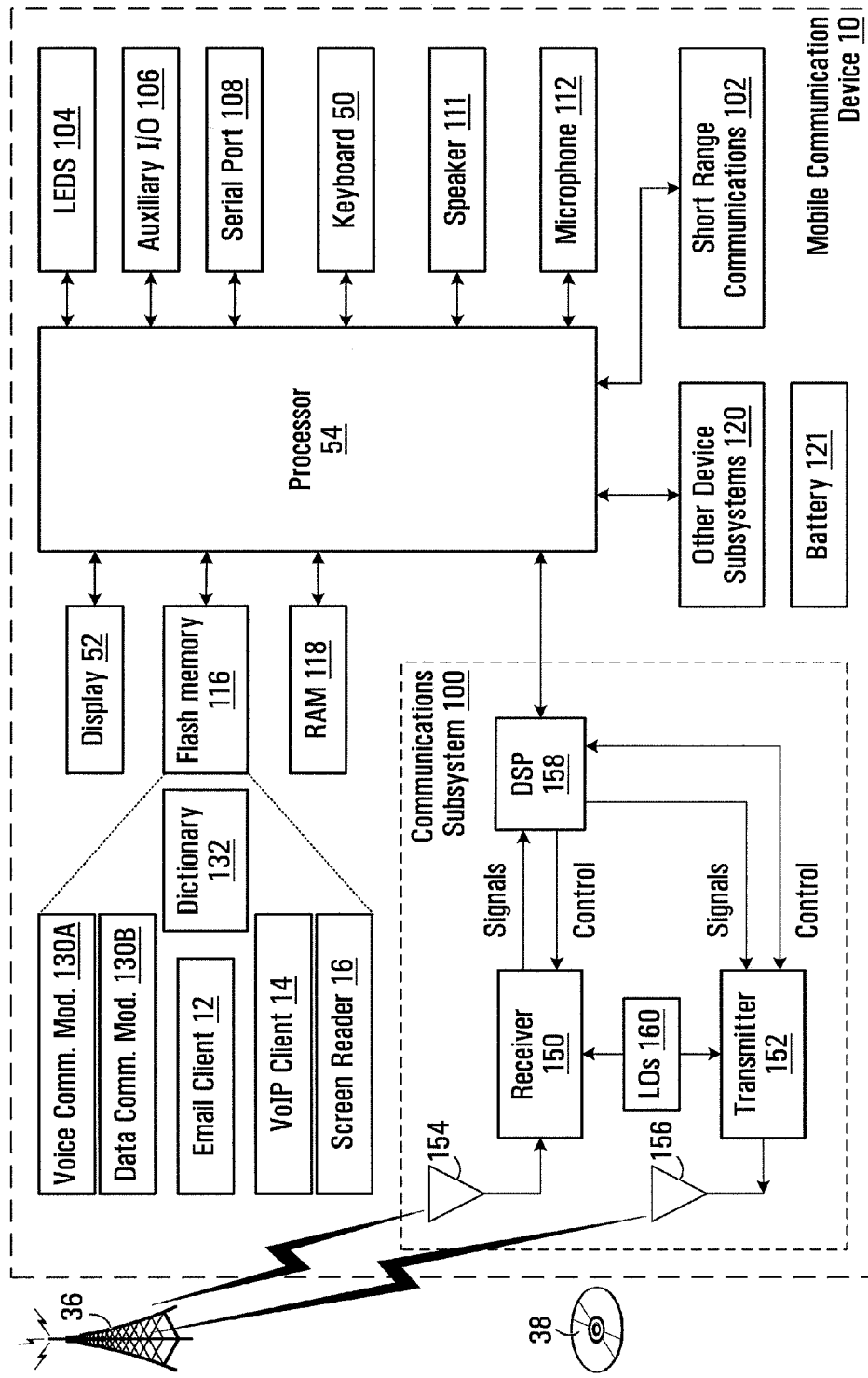
FIG. 2 is a schematic diagram illustrating the wireless communication device of FIG. 1 in greater detail.

Turning to FIG. 2, the wireless communication device 10 of FIG. 1 is illustrated in greater detail. A processor 54 is coupled between the keyboard 50 and the display 52. The processor 54 controls the overall operation of the device 10, including the operation of the display 52, in response to the receipt of inbound messages at device 10 and/or actuation of keys on keyboard 50 by the user.

Various parts of the device 10 are shown schematically in FIG. 2. These include a communications subsystem 100, a short-range communications subsystem 102, a set of auxiliary I/O devices 106, a serial port 108, a speaker 111, a microphone 112, memory devices including a flash memory 116 and a Random Access Memory (RAM) 118, various other device subsystems 120, and a battery 121 for powering the active elements of the device.

Operating system software executed by the processor 54 is stored in persistent memory, such as the flash memory 116, but could alternatively be stored in other types of memory devices, such as a read only memory (ROM) or a similar storage element. In addition, system software, specific device applications, or parts thereof, may be temporarily loaded into a volatile memory, such as the RAM 118. Communication signals received by the device may also be stored to the RAM 118.

The processor 54, in addition to its operating system functions, enables execution of software applications (computer programs) 130A, 130B, 12, 14 and 16 on the device 10. A predetermined set of applications that control basic device operations, such as voice and data communications 130A and 130B, may be installed on the device 10 during manufacture along with the operating system. The email client 12, Voice over IP client 14 and screen reader 16 applications may be loaded into flash memory 116 of device 10 from a machine-readable medium 38 (e.g. an optical disk or magnetic storage medium), either via wireless network 36 (e.g. by way of an over-the-air download) or directly to the device 10, by a manufacturer or provider of the device for example.

The email application 12 is a conventional email application that facilitates composition of outgoing email messages. The VoIP client 14 is a conventional wireless VoIP client that permits a user to initiate a VoIP call to another party by specifying that party's Session Initiation Protocol (SIP) Uniform Resource Identifier (URI), which is a form of network address. SIP URIs are described in Request For Comments (RFC) 3261 (presently available at www.ietf.org/rfc/rfc3261.txt). The VoIP client also facilitates receipt of VoIP calls from other parties having assigned SIP URIs. The screen reader application 16 is a conventional wireless screen reader application, such as Nuance TALKS™ from Nuance Communications, Inc. or one of the Mobile Speak® line of screen readers from Code Factory, S.L. than has been modified for the purpose of facilitating text-to-speech conversion of network addresses, as described herein. Other known screen reader applications which might be similarly modified (not necessarily for a wireless platform) may include the Microsoft® Text-To-Speech engine within the Windows XP™ operating system, JAWS® for Windows made by Freedom Scientific™ (see www.freedomscientific.com/fs_products/software_jaws.asp) and the AT&T® Labs Text-to-Speech Demo (see www.research.att.com/~ttsweb/tts/demp.php).

Flash memory 116 also stores a dictionary 132. Dictionary 132 is a data structure, such as a hash table or patricia tree, which is used to represent a predetermined set of recognized words. As will become apparent, the dictionary 132 is used to identify recognized words within a network address, so that those words can be pronounced as such (e.g. rather than character by character) when the network address is converted to speech. In the present embodiment, recognized words include a set of words in a spoken language (English in this example) as well as names of organizations (e.g. corporations, enterprises, and other entities), including common abbreviations of organization names (e.g. "RIM" for Research In Motion, Ltd.). The set of words in a spoken language may be based on a "corpus". As is known in the art, a corpus (or "text corpus") is a large and structured set of texts which identifies words forming part of a spoken language (e.g. English, Spanish, French, etc.) as well as the frequencies of occurrence of the word within that language. The British National Corpus ("BNC") is an example of a well-known corpus covering British English of the late twentieth century. Thus, dictionary 132 might contain representations of the 25,000 most common words in the English language, typically (but not necessarily) including proper nouns. The number of represented words may vary in different embodiments and may depend in part upon any operative memory size constraints of the device 10. The names of organizations may for example include names of any of the following types of organization: affiliations, alliances, associations, bands, bodies, businesses, clubs, coalitions, companies, concerns, consortia, corporations, fellowships, fraternities, industries, institutes, institutions, leagues, orders, parties, professions, societies, sororities, squads, syndicates, teams, trades, troupes, trusts and unions. The reason for including organization names and abbreviations within the set of recognized words is that organization names or abbreviations often form part of the domain name (also referred to as the "hostname") portion of email addresses (i.e. the portion following the "@" symbol, e.g. user@acme.com or user@rim.com). The dictionary may also be used in some embodiments to facilitate pronunciation of the username portion of certain email addresses (e.g. service@cardealer.com or helpdesk@company.com).

The high-level description regarding the architecture and general operation of device 10 that follows provides an overview of the general structure of the device.

Communication functions, including data and voice communications, are performed by device 10 through the communication subsystem 100, and possibly through the short-range communications subsystem 102. The communication subsystem 100 includes a receiver 150, a transmitter 152, and one or more antennas 154 and 156. In addition, the communication subsystem 100 also includes a processing module, such as a digital signal processor (DSP) 158, and local oscillators (LOs) 160. The specific design and implementation of the communication subsystem 100 is dependent upon the communication network in which the device 10 is intended to operate. For example, the communication subsystem 100 of the device 10 may be designed to operate with the Mobitex™, DataTAC™ or General Packet Radio Service (GPRS) mobile data communication networks and may also be designed to operate with any of a variety of voice communication networks, such as AMPS, TDMA, CDMA, PCS, GSM, etc. Other types of data and voice networks, both separate and integrated, may also be utilized with the device 10.

Network access requirements vary depending upon the type of communication system. For example, in the Mobitex™ and DataTAC™ networks, devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the wireless communication device 10 may send and receive communication signals over the wireless network 36. Signals received from the wireless network 36 by the antenna 154 are routed to the receiver 150, which provides for signal amplification, frequency down conversion, filtering, channel selection, etc., and may also provide analog-to-digital conversion. Analog-to-digital conversion of the received signal allows the DSP 158 to perform more complex communication functions, such as demodulation and decoding. In a similar manner, signals to be transmitted to the network 110 are processed (e.g. modulated and encoded) by the DSP 158 and are then provided to the transmitter 152 for digital-to-analog conversion, frequency up conversion, filtering, amplification and transmission to the wireless network 36 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

The short-range communications subsystem 102 enables communication between the device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

Figure 3A:
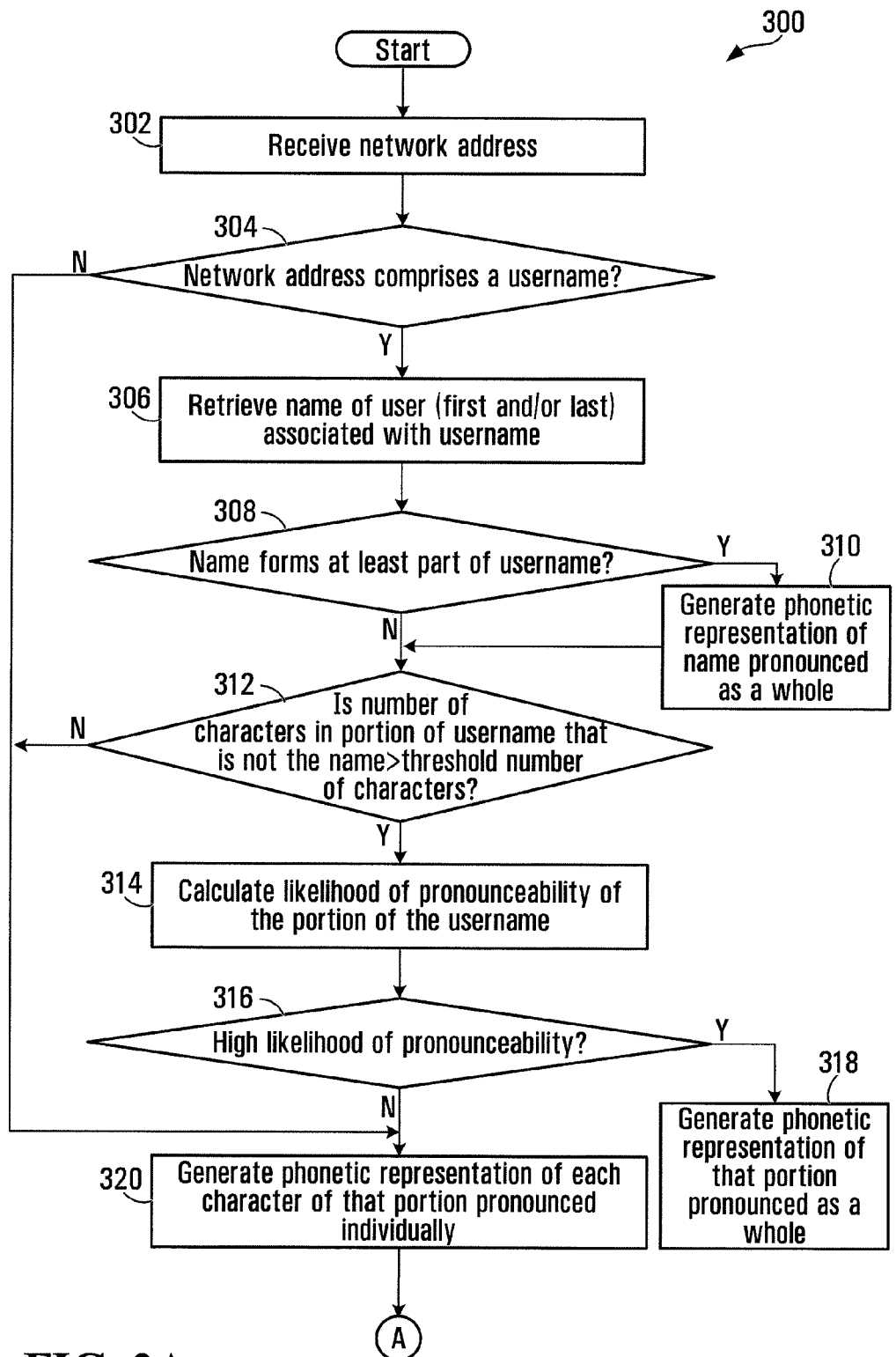
FIGS. 3A and 3B illustrate operation of a screen reader application at the wireless communication device of FIG. 1 for facilitating text-to-speech conversion of a network address or a portion thereof.
Figure 3B:
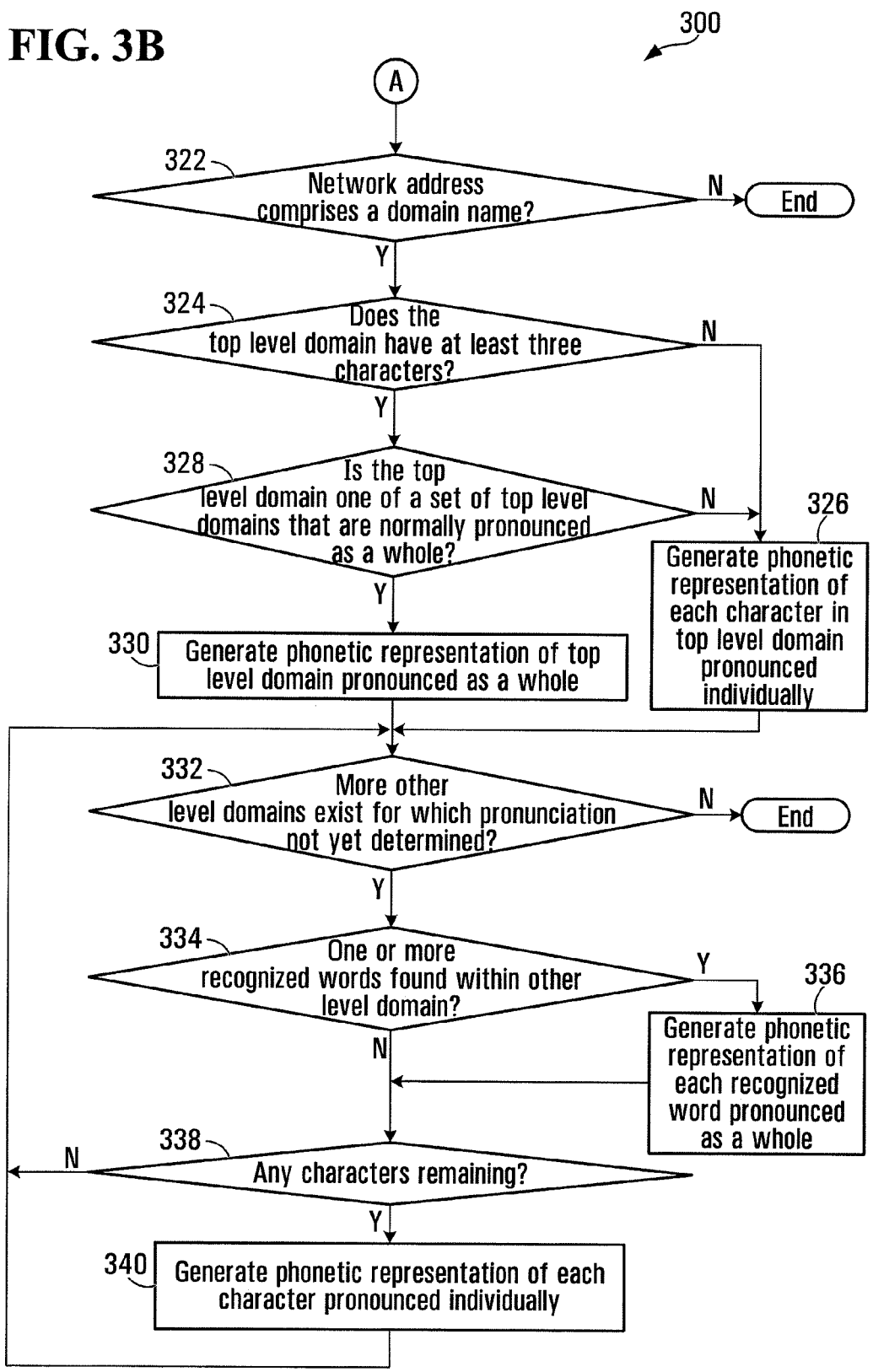

Operation 300 of the screen reader application 16 for facilitating text-to-speech conversion of email addresses is illustrated in FIGS. 3A and 3B. The purpose of operation 300 is to generate a phonetic representation of email address 59, be it actual speech or a phonetic representation that can be used to generate speech (e.g. a sequence of tokens representing phonemes). In the description that follows, it is assumed that a UI screen has just been displayed on display 52, as shown in FIG. 1, and that screen reader application 16, which has been configured to "read aloud" newly-displayed screens in a particular language (here, English), is now faced with the task of determining a phonetic representation for the textual email address 59, "sjones@work.us", which is highlighted in FIG. 1.

Referring to FIG. 3A, initially the email address (which, again, is a form of network address) is received by the screen reader 16 (302). The email address may be received by any conventional technique, such as the technique(s) used by conventional screen reader applications to identify text to be converted to speech from a UI screen of a separate application.

Figure 4:
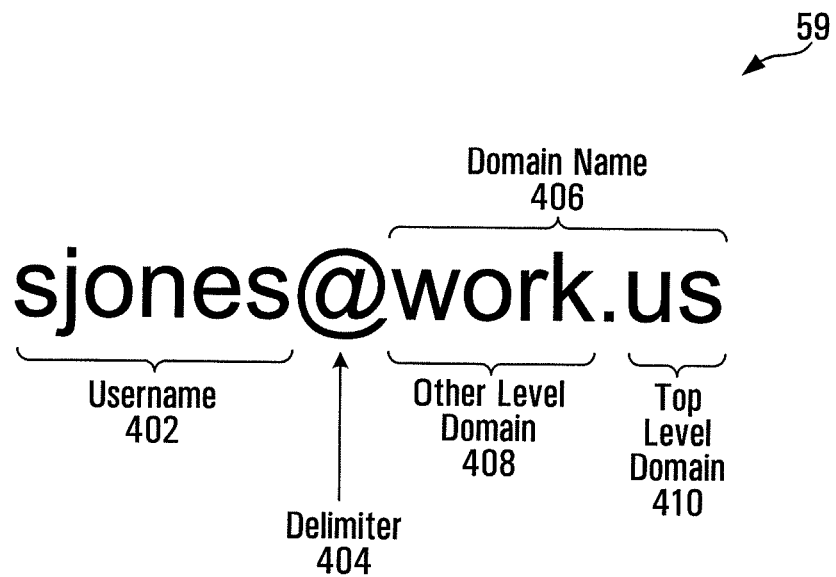
FIG. 4 illustrates an exemplary textual network address whose conversion to speech is facilitated by the operation illustrated in FIGS. 3A and 3B.

Next, a determination is made as to whether the network address comprises a username (S304). If no username exists, then operation jumps to 322 (FIG. 3B). As shown in FIG. 4, in the case of email addresses such as email address 59, the username (FIG. 4) is the portion of the email address before the "@" symbol delimiter 404, i.e. "sjones", which is identified by reference numeral 402 in FIG. 4. The portion after the delimiter 404 is referred to herein as the "domain name" 406, and is handled by operation starting at 322 (FIG. 3B), which is described later.

Next, the name of the user associated with the email address 59, which may be a first or last name of a person (or both), is retrieved (306, FIG. 3A). The name may be retrieved in various ways. For example, the email address may be used as a "key" to look up an entry in a contacts list or address book executing at device 10 (e.g. within a conventional personal information manager application), from which name information may be read. Alternatively, the email address 59 may be used to look up name information within a remote data store, such as an Internet-based database. In a further alternative, the name may be determined by parsing a human-readable display name that may be received in conjunction with, and may be displayed as part of, the email address, e.g. "Stephen Jones <sjones@work.us>". In the latter case, the display name "Stephen Jones" may be parsed to identify "Stephen" as a first name and "Jones" as a second name. During such parsing, any conventional titles (e.g. "Mr." or "PhD") or middle names may be disregarded in order to facilitate identification of the person's first and/or last name and cues as the presence of absence of a comma may be used to distinguish the first name from the last name.

Once the user's name has been retrieved, the username 402 is then searched for substrings comprising the person's first and/or last name (308, FIG. 3A). In the present example, the username "sjones" is accordingly searched for substrings comprising "Stephen" or "Jones". Although not required, the username may also be searched for common or diminutive variations of the first name (e.g. "Steve" in addition to "Stephen"). Such diminutive forms might be determinable by way of a "many-to-many" map of a dictionary (e.g. the names "Genine" and "Genevieve" may both be mapped to the dimunitive form "Gen"; conversely, the name "Jennifer" may be mapped to both dimunitive forms "Jenny" and "Jen"). If the user's first name (or a common or diminutive variation thereof) or last name is found to comprise a portion of the username 402, then a phonetic representation of that name, pronounced as a whole (i.e. not character by character), is generated (310). So, in the present example, because only the last name "Jones" is found within the username "sjones" (with neither "Stephen" nor "Steve" being found within the username), a phonetic representation of "Jones", pronounced as a whole, is generated. It should be appreciated that this phonetic representation is associated with only the "jones" portion of the username and will ultimately form part of an overall phonetic representation of the whole email address 59 that will include phonetic representations of other portions of the email address 59.

Although not expressly illustrated in FIG. 3A, it is noted that operation 306-310 could be performed for only last name of the person (e.g. if the username format is expected to be "<first initial><last name>"), only the first name of the person (e.g. if the username format is expected to be "<first name><last initial>"), or for both names (e.g. if the username format is expected to, or might, contain both names, e.g. "<first name>.<last name>"). Searching for both the first name and the last name is likely the most computationally intensive of these approaches, however it typically provides the greatest flexibility in handling the widest range of possible username formats. Where both the first name and the last name are found within the username, then phonetic representations of both the first name pronounced as a whole and the last name pronounced as a whole would be included in the phonetic representation of the username. Pronunciation of an initial between names may also be supported.

After the user's first and/or last name are identified within the username 402, one or more characters may be left over that are neither the user's first name nor the user's last name (e.g. the "s" in "sjones" in the present example). If such a "leftover" portion of the username 402 is found to exist, the number of characters therein is initially counted. If the number of characters fails to exceed a predetermined threshold, e.g. two characters (312), then a phonetic representation of each character pronounced individually is generated (320). The rationale for generating a phonetic representation of each character individually when the number of characters is two or less is that, even if those characters might be conventionally pronounced "as a whole" when the email address is read aloud by a human (which is unlikely, because relatively few words appearing in typical email address usernames have only two characters), may be twofold. First, any inconvenience to the user for having to listen to the characters pronounced individually may be considered minimal because the amount of time required for two characters to be pronounced is relatively short. Second, any such inconvenience may be considered to be an acceptable trade-off for avoiding the computation involved in ascertaining whether the characters are likely to be pronounceable as a whole and, if so, in generating a phonetic representation of the characters pronounced as a whole. Thus, in the present example, because the number of characters in the leftover portion, "s", is only one, a phonetic representation of that character (i.e. "ess") would be generated at 320.

If, on the other hand, it is determined in 312 (FIG. 3A) that the number of characters exceeds the predetermined threshold, a likelihood of pronounceability for the characters in the leftover portion of the username is calculated (314). The likelihood of pronounceability reflects the likelihood that the set of characters can be pronounced as a whole in the relevant spoken language without deviating from linguistic convention or "sounding strange". The likelihood of pronounceability may be calculated in various ways. In one approach, the characters may be parsed into sequential letter pairs or letter triplets, and the relative frequency of occurrence of the pairs/triplets within the relevant language may be assessed, e.g. using a letter pair/triplet frequency table. If the relative frequencies exceed a threshold, the likelihood of pronounceability may be considered to be high. So, using this approach, the likelihood of pronounceability of a set of leftover characters that is, say, "zqx" would be much lower than the likelihood of pronounceability of the set of characters "ack", since the letter pairs or triplet of the former are far less common in the English language than the letter pairs or triplet of the latter. Another approach for calculating the likelihood of pronounceability is to check whether the leftover characters form a "prefix" portion of whichever one of the user's first or last name is not found within the username. For example, if a username "olinorth" which corresponds to a user named Oliver North, were processed in the fashion described above, such that the last name "north" were found to comprise the name, then the first name, "oliver", which is not found within the username, may be examined to determine whether the remainder portion "oli" forms a prefix of that first name. If so (as in the "oli" example), then the likelihood of pronounceability of that portion may be considered high.

If the likelihood of pronounceability is found to be high (316), then a phonetic representation of the leftover portion of the user name, pronounced as a whole, is generated (318). Otherwise, a phonetic representation of each character in that portion, pronounced individually, is generated (320).

At this stage of operation 300, the pronunciation of the username portion of the email address has been determined, with the possible exception of any punctuation that may form part of the username, such as ".", "-" and "_". If such punctuation is found, conventional phonetic representations thereof (e.g. phonetic representations of the words "dot", "hyphen" and "underscore", respectively) may be generated and added in the proper place within the generated phonetic representation of the username.

Next, a determination is made as to whether the network address comprises a domain name (322, FIG. 3B). If no domain name is found within the network address, then operation 300 terminates, and the generated phonetic representation of the username 402 (to the extent that one has been generated at 306-320 of FIG. 3A) may form the basis of a pronunciation of the network address by screen reader 16.

If, however, the network address does comprise a domain name, as will be true for addresses such as email address 59 (i.e. domain name 406 in FIG. 4), then pronunciation of the domain name is determined. Initially, the number of characters in the top level domain, i.e. in the characters following the final dot of the domain name (top level domain 410 of FIG. 4), is compared to a threshold number of characters, which is three in the present embodiment. If the number of top level domain characters is not at least as large as the threshold number of characters, then a phonetic representation of each character in the top level domain, pronounced individually, is generated (326). The rationale for pronouncing each character of the top level domain individually when the number of characters is less than three is similar to the above-described rationale for individually pronouncing each character of any "leftover" portion of the username that is not the user's name when the number of characters in the leftover portion is two or less. Thus, in the case of country code top level domains (ccTLDs), such as "us" in the present example, which contain two characters, operation at 326 of FIG. 3B is performed.

If, on the other hand, the top level domain has at least three characters (e.g. as would be the case for domain names ending in ".com" or ".net"), operation proceeds to 328 of FIG. 3B. At 328, a determination is made as to whether the top level domain 410 is one of a predetermined set of top level domains that is normally pronounced as a whole. This predetermined set of top level domains may include such generic top level domains as "com", "net", "org", "biz", "gov", "mil", "name", "aero", "asia", "info", "jobs", "mobi", "museum", "name", "pro", "tel" and "travel", for example. The determination at 328 may be made in various ways. In one approach, a data structure, such as a lookup table, containing all of the top level domains that are normally pronounced as a whole may be searched for the top level domain whose pronunciation is being determined, with a match resulting in the "yes" branch being followed from decision box 328 of FIG. 3B, and the absence of a match resulting in the "no" branch being followed. In a converse approach, a data structure, such as a lookup table, containing all of the top level domains that are not normally pronounced as a whole (e.g. as may be the case for the top level domain "edu", which is conventionally spelled out as "ee dee you" when pronounced by humans) may be searched for the top level domain whose pronunciation is being determined, with a match resulting in the "no" branch being followed from decision box 328, and the absence of a match resulting in the "yes" branch being followed. Whatever approach is used, if the "no" branch is followed, then a phonetic representation of each character in the top level domain, pronounced individually, is generated (326), as described above. Otherwise, if the "yes" branch is followed, then a phonetic representation the top level domain, pronounced as a whole, is generated (330).

Subsequent operation at 332-340 of FIG. 3B is for determining a pronunciation for each "other level domain" forming part of the domain name portion of the network address. An "other level domain" is a second, third or higher level domain (also referred to as a "subdomain") forming part of the domain name. In the illustrated embodiment, the domain name 406 only contains one other level domain 408, i.e. the second level domain whose value is "work" (see FIG. 4). For each such other level domain whose pronunciation has not yet been determined (332, FIG. 3B), the other level domain is searched for one or more recognized words (334). If any recognized word(s) is/are contained within the other level domain, a phonetic representation of each recognized word, pronounced as a whole, is generated (336). In the present embodiment, a word is considered to be "recognized" if it is contained in dictionary 132 (FIG. 2), described above. Notably, operation at 334 may include identifying multiple recognized words within a single other level domain, which words may be concatenated or separated by delimiter characters, such as "-" or "_", within the other level domain (e.g. "small-business", "small-business", or "small_business"). Conventional technique(s) may be used to identify multiple recognized words within an other level domain.

If any characters that are not part of a recognized word remain in the other level domain (338), a phonetic representation of those characters, pronounced individually, is generated (340).

Operation at 332-340 repeats until a pronunciation for each other level domain has been determined, at which point operation 300 terminates.

Upon completion of operation 300, the screen reader 16, which has now determined phonetic representations of the username 402 and domain name 406, may read the email address 59 aloud, with the word "at" being spoken to represent the "@" symbol within the network address and the word "dot" being spoken for each "." between subdomains. As a result, the exemplary email address of FIG. 4, "sjones@work.us", would be pronounced "ess jones at work dot you ess", as illustrated in FIG. 1.

It should be appreciated that, whenever a phonetic representation of a word or words "as a whole" is generated during operation 300 (e.g. at 310 (FIG. 3A), 318, 330 (FIG. 3B), or 336), conventional mechanisms for generating such phonetic representations (e.g. known text-to-speech engines) may be used.

The pronunciations of various exemplary network addresses that may result from operation 300 are illustrated in FIG. 5.

It will be appreciated that, although the exemplary network address in the above-described embodiment is an email address, the same approach could be used for facilitating text-to-speech conversion of other forms of network addresses. For example, as is known in the art, a SIP URI has a format that essentially amounts to an email address with a "sip:" prefix. Accordingly, the same technique as is described in operation 300 above could be used to generate a phonetic representation of a SIP URI, with the exception that a phonetic representation of the words "sip colon" might be prepended thereto.

It should also be appreciated that some forms of network addresses may only consist of a username or a domain name. For example, the username of an instant messaging account, operating system account or user account on a corporate network may be considered a form of network address having username but no domain name. In that case, the operation illustrated at 306-320 of FIG. 3A could still be applied in order to generate a phonetic representation of the username, with the operation at 324-340 of FIG. 3B being unnecessary and thus circumvented. Alternatively, the domain name portion of a Uniform Resource Locator (URL), or simply a domain name in isolation, may be considered a form of network address having a domain name but no username. In that case, the operation described at 324-340 of FIG. 3B could still be applied to generate a phonetic representation of the domain name, with the operation at 306-320 of FIG. 3A being circumvented. Alternatively, it may be desired to determine a pronunciation for only the username portion or only the domain name portion of a network address having both of these portions. In such cases, the operation illustrated at 324-340 of FIG. 3B or the operation at 306-320 of FIG. 3A (respectively) could be circumvented.

As will be appreciated by those skilled in the art, various other modifications can be made to any of the above-described embodiments. For example, although operation 300 of FIGS. 3A and 3B shows operation for determining the pronunciation of the username portion of a network address as being performed prior to the determination of a pronunciation of the domain name portion of the network address, this order could be reversed in alternative embodiments.

Moreover, although the above description sets forth a possible rationale for making the operation at 314 and 316 of FIG. 3A contingent upon the number of characters in a "leftover" portion of the username not exceeding a predetermined threshold number of characters (e.g. two characters), as determined by way of decision box 312 of FIG. 3A, in some embodiments, decision box 312 may be omitted. Instead, after 308 or 310, control may proceed directly to the operation at 314. In such embodiments, the likelihood of pronounceability of the leftover portion that is determined at 314 may be set to "low" when the leftover portion comprises only one character, so that the character is pronounced individually by way of operation 320 of FIG. 3A.

In another alternative, decision box 324 of FIG. 3B could be omitted, with control proceeding directly from 322 to 328 of FIG. 3B. In this case, the predetermined set of top level domains that is normally pronounced as a whole could simply reflect the fact that two-letter top level domains, such as ccTLDs, are not normally pronounced as a whole.

In yet another alternative, logic for facilitating text-to-speech conversion of usernames that, instead of being based solely or primarily on a user's name, either include or consist exclusively of one or more recognized words from a spoken language (e.g. service@cardealer.com or helpdesk@company.com) may form part of some embodiments. Such logic may be similar to the logic illustrated in FIG. 3B at 334 to 340, described above, for determining a pronunciation of an other level domain. The logic may be applied, e.g., between 304 and 306 in FIG. 3A or after it has been determined that the user's name does not form any part of the username. In this case the dictionary 132 may be used to search for recognized words within the username. Exemplary pronunciations of email addresses containing usernames of this nature are provided in FIG. 6.

Also, it should be appreciated that the operation described herein is not necessarily part of a screen reader application, nor is it necessarily performed by a wireless communication device. It could be effected in software, hardware, firmware, or combinations of these, which could form part of virtually any type of computing device.

The above-described embodiments all make reference to "generating a phonetic representation" of names, words and/or characters. Such a phonetic representation may subsequently be fed to an audio waveform generator that generates the desired speech. It should also be recognized, however, that in some embodiments, the generation of a phonetic representation may actually be performed by a downstream TTS engine (e.g. an "off-the-shelf" product) that is fed appropriate input to cause the desired speech to be generated. Such a TTS engine may execute on a separate computing device with which the device 10 intercommunicates, e.g., over a Bluetooth™ or USB connection. For example, the TTS engine may be executed by an on-board computer of a motor vehicle which receives input from wireless communication device 10. In such embodiments, it may only be necessary for the device 10 to generate a tokenized representation of the network address, and to pass the tokens to the TTS engine over the connection, for the desired pronunciation to result. The tokens may constitute groupings of characters from the network address that will cause a phoneticizer within the TTS engine to produce the desired pronunciation. For example, upon processing the network address "liz@buckingham.uk", such an alternative embodiment may generate the following stream of tokens (wherein a token can be a word, a character or punctuation mark): "liz @ buckingham dot u k". In the foregoing, the token "liz" constitutes a tokenized representation of that name as a whole, where the tokens "u", "k" constitute a tokenized representation of each individual character of top level domain "uk". These tokens may be provided to the downstream TTS engine (which again, may be a commerically available product) that may convert the tokens to speech, e.g. by way of a two-step process: (1) a phoneticizer may generate a phonetic representation of the desired sounds based on the tokens; and (2) an audio waveform generator may generate the desired sounds based on the phonetic representation. Thus, it will be appreciated that, in some embodiments, rather than generating a phonetic representation of a network address or portion thereof, it may only be necessary to appropriately tokenize the network address or portion thereof (i.e. to generate a tokenized representation thereof comprising words, characters and/or punctuation) for the proper pronunciation to result through operation of a downstream TTS engine.

Other modifications will be apparent to those skilled in the art and, therefore, the invention is defined in the claims.

What is claimed is:

1. A method comprising:
   determining, at a computing device, whether a top level domain of a network address is one of a set of top level domains that are pronounced as a whole by:
      causing a processor of the computing device to search a data structure comprising all top level domains of the set of top level domains that are pronounced as a whole and to determine whether the top level domain of the network address matches one of the top level domains of the set of top level domains that are pronounced as a whole, the data structure being stored in memory of the computing device; and,
      in response to determining that the top level domain of the network address does not match one of the top level domains of the set of top level domains that are pronounced as a whole, causing the processor to one or more of:
         generate a phonetic representation of each character in the top level domain pronounced individually and generate speech from the phonetic representation of each character in the top level domain pronounced individually at an audio waveform generator of the computing device; and,
         generate a tokenized representation of each individual character of the top level domain suitable for interpretation by a text-to-speech engine; and
      for each other level domain of the network address, causing the processor to determine a pronunciation of the other level domain.

2. The method of claim 1, wherein in response to determining that the top level domain of the network address matches one of the top level domains of the set of top level domains pronounced as a whole, the causing the processor to one or more of:
   generate a phonetic representation of the top level domain pronounced as a whole and generate speech from the phonetic representation of the top level domain pronounced as a whole at the audio waveform generator; and,
   generate a tokenized representation of the top level domain pronounced as a whole, suitable for interpretation by the text-to-speech engine.

3. The method of claim 1, wherein causing the processor to determine whether the top level domain of the network address matches one of the top level domains of the set of top level domains comprises determining that the top level domain of the network address does not match one of top level domains of the the set of top level domains that are pronounced as a whole when the top level domain of the network address is a country code top level domain (ccTLD).

4. The method of claim 1, wherein causing the processor to determine the pronunciation of the other level domain when one or more recognized words within the other level domain matches one recognized word of a set of recognized words in a dictionary stored in the memory of the computing device, the dictionary comprising the set of recognized words.

5. The method of claim 1, wherein causing the processor to determine the pronunciation of the other level domain comprises:
    searching a dictionary comprising all recognized words of a set of recognized words to determine whether the other level domain matches one of the recognized words of the set of recognized words, the dictionary being stored in the memory of the computing device; and,
    in response to determining that the other level domain does not match one of the recognized words in the set of recognized words, then one or more of:
        generating a respective phonetic representation of each respective character in the other level domain pronounced individually and generating speech from the respective phonetic representation of each respective character in the other level domain pronounced individually utilizing the audio waveform generator; and,
        generating a respective tokenized representation of each respective individual character of the other level domain suitable for interpretation by the text-to-speech engine.

6. The method of claim 1, wherein the set of top level domains that are pronounced as a whole comprises two or more of "com", "net", "org", "biz", "gov", "mil", "name", "aero", "asia", "info", "jobs", "mobi", "museum", "pro", "tel" and "travel".

7. The method of claim 1, wherein the network address comprises one or more of an electronic mail (email) address, a Session Initiation Protocol (SIP) Uniform Resource Identifier (URI), and a Uniform Resource Locator (URL).

8. The method of claim 1, further comprising:
    causing the processor to determine a respective pronunciation of one or more parts of a username in the network address based on a determination that the one or more parts comprises one or more of: a recognized word from a spoken language, a first name, a last name, and a diminutive variation of the first name.

9. The method of claim 8, wherein causing the processor to determine the respective pronunciation of the one more parts comprises one or more of:
    generating the respective pronunciation of the one or more parts, each pronounced as a whole and generating speech from the respective pronunciation of the one or more parts utilizing the audio waveform generator; and,
    generating a respective tokenized representation pronunciation of the one or more parts, each pronounced as a whole, suitable for interpretation by the text-to-speech engine.

10. A computing device comprising:
    a processor;
    an audio waveform generator; and
    a memory storing a data structure comprising all top level domains of a set of top level domains that are pronounced as a whole;
    the processor operably coupled to the memory and the audio waveform generator and configured to:
        search the data structure and determine whether a top level domain of a network address matches one of the top level domains of the set of top level domains that are pronounced as a whole; and,
        in response to determining that the top level domain of the network address does not match one of the top level domains of the set of top level domains pronounced as a whole, then one or more of:
            generate a phonetic representation of each character in the top level domain pronounced individually and generate speech from the phonetic representation of each character in the top level domain pronounced individually utilizing the audio waveform generator; and,
            generate a tokenized representation of each individual character of the top level domain suitable for interpretation by a text-to-speech engine; and
        for each other level domain of the network address, determine a pronunciation of the other level domain.

11. The device of claim 10, wherein in response to determining that the top level domain matches one of the top level domains of the set of top level domains pronounced as a whole, the processor is further configured to one or more of:
    generate a phonetic representation of the top level domain pronounced as a whole and generate speech from the phonetic representation of the top level domain pronounced as a whole utilizing the audio waveform generator; and,
    generate a tokenized representation of the top level domain pronounced as a whole the text-to-speech engine.

12. The device of claim 10, wherein the processor is further configured to determine whether the top level domain of the network address matches one of the top level domains of the set of top level domains by determining that the top level domain of the network address does not match one of the top level domains of the set of top level domains pronounced as a whole when the top level domain of the network address is a country code top level domain (ccTLD).

13. The device of claim 10, wherein the memory further stores a dictionary comprising all recognized words of a set of recognized words and the processor is further configured to determine the pronunciation of the other level domain when one or more recognized words within the other level domain matches one of the recognized words of the set of recognized words.

14. The device of claim 10, wherein the memory further stores a dictionary comprising all recognized words of a set of recognized words and the processor is further configured to determine the pronunciation of the other level domain by:
    searching the dictionary to determining whether the other level domain matches one of the recognized words of the set of recognized words; and,
    in response to determining that the other level domain does not match one of the recognized words of the set of recognized words, then one or more of:
        generating a respective phonetic representation of each respective character in the other level domain pronounced individually and generating speech from the respective phonetic representation of each respective character in the other level domain pronounced individually utilizing the audio waveform generator; and,
        generating a respective tokenized representation of each respective individual character of the other level domain suitable for interpretation by the text-to-speech engine.

15. The device of claim 14, wherein the set of recognized words comprises one or more of a dictionary, a corpus, names of organizations, and abbreviations of organization names.

16. The device of claim 10, wherein the set of top level domains that are pronounced as a whole comprises two or more of "com", "net", "org", "biz", "gov", "mil", "name", "aero", "asia", "info", "jobs", "mobi", "museum", "pro", "tel" and "travel".

17. The device of claim 10, wherein the network address comprises one or more of an electronic mail (email) address, a Session Initiation Protocol (SIP) Uniform Resource Identifier (URI), and a Uniform Resource Locator (URL).

18. The device of claim 10, wherein the processor is further configured to:
    determine a respective pronunciation of one or more parts of a username in the network address based on a determination that the one or more parts comprises one or more of: a recognized word from a spoken language, a first name, a last name, and a diminutive variation of the first name.

19. The device of claim 18, wherein the processor is further configured to determine the respective pronunciation of the one or more parts by one or more of:
    generating the respective pronunciation of the one or more parts, each pronounced as a whole, and generating speech of the respective pronunciation of the one or more parts utilizing the audio waveform generator; and,
    generating a respective tokenized representation pronunciation of the one or more parts, each pronounced as a whole, suitable for interpretation by the text-to-speech engine.

20. A computer program product, comprising a non-transitory computer-readable medium having a computer-readable program code stored thereon executable by a processor of a computing device to perform a method for text-to-speech conversion of a network address, the method comprising:
    determining, at the computing device, whether a top level domain of the network address is one of a set of top level domains that are pronounced as a whole by:
        causing the processor to search a data structure comprising all top level domains of the set of top level domains that are pronounced as a whole and to determine whether the top level domain of the network address matches one of the top level domains of the set of top level domains that are pronounced as a whole, the data structure being stored in memory of the computing device; and,
        in response to determining that the top level domain of the network address does not match one of the top level domains of the set of top level domains pronounced as a whole, causing the processor to one or more of:
    generate a phonetic representation of each character in the top level domain pronounced individually and generate speech from phonetic representation of each character in the top level domain pronounced individually utilizing an audio waveform generator of the computing device; and,
    generate a tokenized representation of each individual character of the top level domain suitable for interpretation by a text-to-speech engine; and
    for each other level domain of the network address, causing the processor to determine a pronunciation of the other level domain.

* * * * *